(12) United States Patent
Partee et al.

(10) Patent No.: US 11,428,844 B2
(45) Date of Patent: Aug. 30, 2022

(54) ADVANCED MULTI-CAMERA IMAGING SYSTEM WITH POLARIZATION RESPONSIVE ANTENNAS

(71) Applicant: Steel City Optronics, LLC, Longmont, CO (US)

(72) Inventors: Jonathan Partee, Gibsonia, PA (US); Charles Partee, Golden, CO (US)

(73) Assignee: Steel City Optronics, LLC, Longmont, CO (US)

( * ) Notice: Subject to any disclaimer, the term of this patent is extended or adjusted under 35 U.S.C. 154(b) by 793 days.

(21) Appl. No.: 16/362,630

(22) Filed: Mar. 23, 2019

(65) Prior Publication Data

US 2020/0301041 A1    Sep. 24, 2020

(51) Int. Cl.
| | |
|---|---|
| *H01Q 15/16* | (2006.01) |
| *G01V 8/00* | (2006.01) |
| *H01Q 19/18* | (2006.01) |
| *H04N 5/247* | (2006.01) |

(52) U.S. Cl.
CPC ............ *G01V 8/005* (2013.01); *H01Q 15/16* (2013.01); *H01Q 19/18* (2013.01); *H04N 5/247* (2013.01)

(58) Field of Classification Search
CPC ...... H01Q 15/16; H01Q 19/195; H01Q 19/18; G01V 8/005; H04N 5/247
See application file for complete search history.

(56) References Cited

U.S. PATENT DOCUMENTS

| | | | |
|---|---|---|---|
| 4,866,454 A | 9/1989 | Droessler et al. | |
| 5,454,048 A * | 9/1995 | Davis | G01J 3/2846 359/107 |

(Continued)

FOREIGN PATENT DOCUMENTS

| | | | | |
|---|---|---|---|---|
| GB | 2360413 A | * | 9/2001 | ............ G02B 13/06 |
| WO | 2018147929 | | 8/2018 | |

OTHER PUBLICATIONS

International Search Report and Written Opinion for PCT Application PCT/US2020/023666 dated Jul. 16, 2020, which is related to U.S. Appl. No. 16/362,630.

(Continued)

*Primary Examiner* — Ricardo I Magallanes
*Assistant Examiner* — Anh N Ho
(74) *Attorney, Agent, or Firm* — Pritzkau Patent Group LLC (57) ABSTRACT

An imaging system includes a first camera and a second camera. A first antenna arrangement collects image light from a first scene as seen by the first camera, and a second antenna arrangement collects image light from a second, different scene as seen by the second camera. The first antenna arrangement includes a first polarized dish antenna and the second antenna arrangement includes a second polarized dish antenna. The first camera and the second camera are supported with a first polarization of the first polarized dish antenna orthogonal to a second polarization of the second polarized dish antenna such that at least some of the image light from the first scene travels through the second polarized dish antenna to reach the first camera and at least some of the image light from the second scene travels through the first polarized dish antenna to reach the second camera.

19 Claims, 9 Drawing Sheets

(56) References Cited

U.S. PATENT DOCUMENTS

| | | | | |
|---|---|---|---|---|
| 6,313,865 B1* | 11/2001 | Driscoll, Jr. | ............ | G02B 13/06 |
| | | | | 348/36 |
| 7,385,552 B2* | 6/2008 | Archer | .................... | G01S 13/89 |
| | | | | 343/756 |
| 10,345,631 B1 | 7/2019 | Partee et al. | | |
| 10,698,290 B2 | 6/2020 | Partee | | |
| 2013/0229302 A1 | 9/2013 | Bernacki et al. | | |
| 2019/0346736 A1 | 11/2019 | Partee | | |

OTHER PUBLICATIONS

International Preliminary Report on Patentability for PCT Application PCT/US2020/023666 dated Sep. 28, 2021, which is related to U.S. Appl. No. 16/362,630.

* cited by examiner

ADVANCED MULTI-CAMERA IMAGING SYSTEM WITH POLARIZATION RESPONSIVE ANTENNAS

BACKGROUND

The present invention is generally related to the field of imaging systems and, more particularly to an advanced multi-camera imaging system which includes polarization responsive antennas.

Imaging systems, particularly at certain wavelengths, often require the use of physically large antennas for purposes of collecting the wavelength(s) of interest. Millimeter waves, in a generally accepted range from 30 GHz to 300 GHz, serve as an example of wavelengths that have traditionally been problematic in this regard. Applicants recognize that conventional multi-camera imaging systems at these wavelengths would be bulky and unwieldy in terms of both physical dimensions and weight, making it difficult, at best, to produce a reasonably portable or compact multi-camera imaging system.

Applicants bring to light new approaches that are submitted to resolve these limitations, while providing still further benefits, as will be described immediately hereinafter.

SUMMARY

The following embodiments and aspects thereof are described and illustrated in conjunction with systems, tools, and methods which are meant to be exemplary and illustrative, not limiting in scope. In various embodiments, one or more of the above described problems have been reduced or eliminated.

In general, an imaging system and associated method are described. The imaging system can include a first camera and a second camera. A first antenna arrangement collects image light from a first scene as seen by the first camera, and a second antenna arrangement collects image light from a second, different scene as seen by the second camera. The first antenna arrangement includes a first polarized dish antenna and the second antenna arrangement includes a second polarized dish antenna. The first camera and the second camera are supported with a first polarization of the first polarized dish antenna orthogonal to a second polarization of the second polarized dish antenna such that at least some of the image light from the first scene travels through the second polarized dish antenna to reach the first camera and at least some of the image light from the second scene travels through the first polarized dish antenna to reach the second camera.

BRIEF DESCRIPTION OF THE DRAWINGS

Example embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims.

Applicants hereby describe an advanced multi-camera imaging system with polarization responsive antennas which may be referred to interchangeably as reflectors. The system can be used for any suitable range of electromagnetic energy such as, for example, from 1 GHz to 250 GHz so long as a polarization responsive antenna can be produced at the wavelength or wavelengths of interest. From a practical standpoint, polarization responsive reflectors can be produced using a grating of parallel electrical conductors. The spacing between grating elements is dictated by the lowest wavelength or lower bound of the wavelengths of interest, with shorter wavelengths requiring finer spacing. The lowest wavelength or wavelength ranges that can be accommodated are governed by how finely spaced the grating elements can practically be manufactured. Spacings between grating elements down to approximately 0.1 mm have been produced. Such a grating spacing would serve as a polarization responsive reflector for frequencies in the vicinity of 250 GHz and below. Generally, a well-designed polarization responsive reflector can be over 80% efficient. Generally, the wire to wire spacing governs the lowest wavelength that will be reflected. All wavelengths that are longer than such lowest wavelength will be reflected until reaching the limit at which the wavelengths are so long that the dishes physically too small to capture the wavelength.

For purposes of these descriptions and the appended claims, electromagnetic energy that is collected from a scene may be referred to as light or image light.

Turning now to the drawings, it is noted that the figures are not to scale and are diagrammatic in nature in a way that is thought to best illustrate features of interest. Descriptive terminology such as, for example, upper/lower, top/bottom, horizontal/vertical, left/right and the like, may be adopted with respect to the various views provided in the figures for purposes of enhancing the reader's understanding and is in no way intended to be limiting. All embodiments described herein are submitted to be operational irrespective of any overall physical orientation. It is noted that like reference numbers may be used to refer to like items throughout the various figures.

Figure 1:
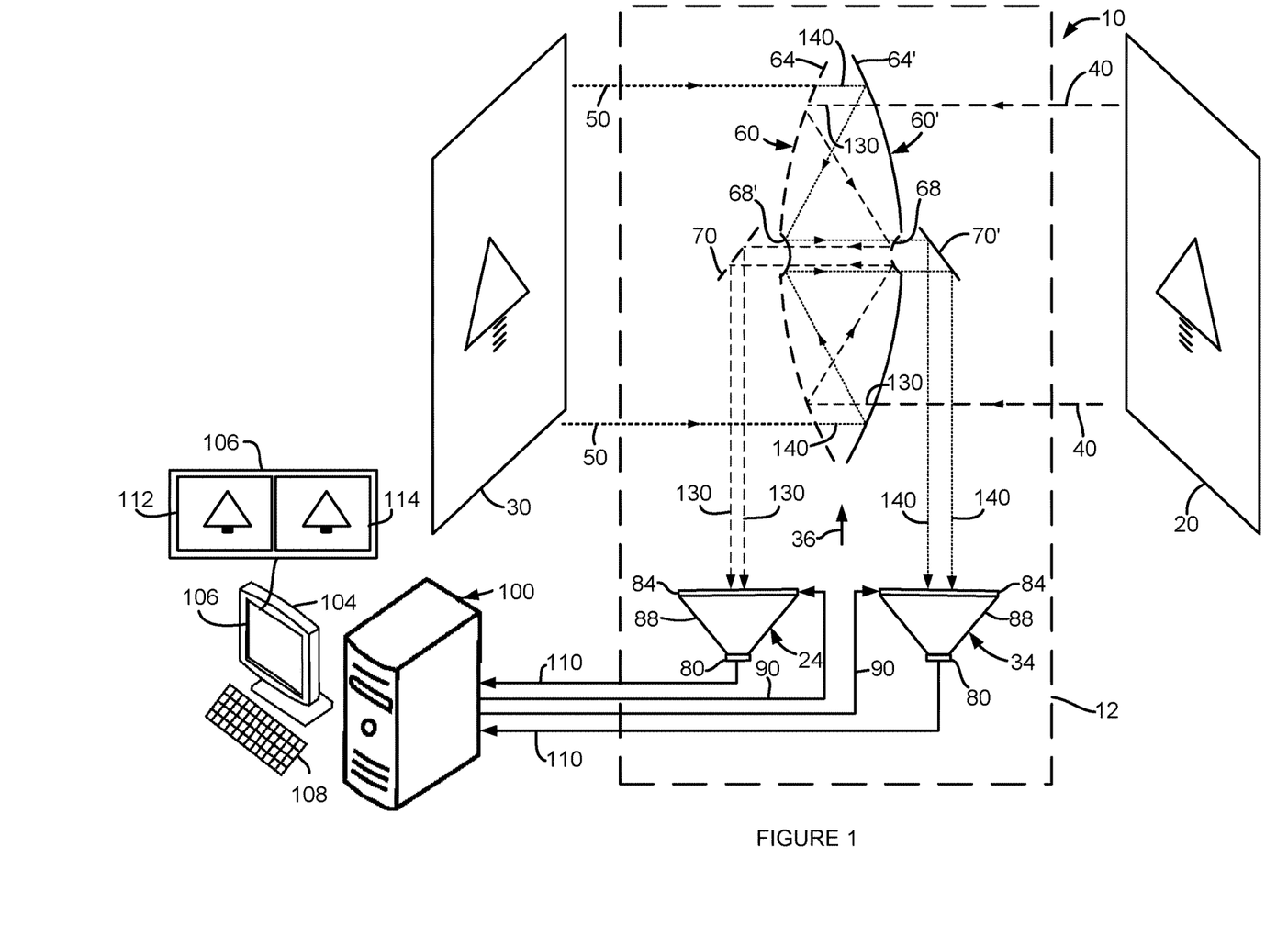
FIG. 1 is a diagrammatic view, in elevation, illustrating an embodiment of an imaging system produced in accordance with the present disclosure.

FIG. 1 is a diagrammatic view, in elevation, illustrating an embodiment of an imaging system, generally indicated by the reference number 10, produced in accordance with the present disclosure. System 10 is shown within a housing 12 that is diagrammatically illustrated by a dashed rectangle. System 10 is configured for imaging a first scene 20 using a first camera 24 and a second scene 30 using a second camera 34. In the present embodiment, scenes 20 and 30 are in opposite directions with respect to one another from the imaging system as one would expect from a pair of cameras that are arranged back-to-back. The cameras in the present embodiment, however, are not positioned back-to-back. Instead, the cameras face, at least generally, in a common viewing direction 36.

System 10 receives first image light 40, which is designated by a pair of ray traces that are shown as dashed lines, from first scene 20, while receiving second image light 50, which is designated by another pair of ray traces that are shown as dotted lines, from second scene 30. Details relating to the light paths for ray traces associated with light from the first scene and the second scene will be provided below in the context of a discussion of the operation of system 10. It is noted that the system can be (1) passive, relying only on ambient light, (2) active, relying on supplemental or artificial illumination or (3) use some combination of ambient and supplemental illumination. In the illustrated, but non-limiting embodiment, the cameras are single pixel sensors responsive to millimeter wave electromagnetic radiation or light and each of which includes a spatial light modulator, as will be further described at an appropriate point below. For purposes of the present disclosure, millimeter wave (MMW) electromagnetic radiation extends from about 30 GHz (approximately 10 mm in wavelength) to 300 GHz (approximately 1 mm in wavelength).

A first antenna arrangement 60, for first camera 24, receives a portion of image light 40 from the first scene. The first antenna arrangement includes a first linearly polarized parabolic or primary reflector 64 and a first polarized secondary reflector 68. Given that incident light 40 is generally unpolarized, some amount of the incident light is not accepted by the first polarized parabolic reflector, however, in many cases, the associated camera sensor is also linearly polarized such that this polarization loss, resulting from the reflector polarization, is of no consequence. First parabolic reflector 64 can include any suitable peripheral shape such as, for example, circular to form a parabolic dish. Accordingly, such a parabolic reflector may be referred to as a dish antenna or reflector for purposes of the present descriptions and the appended claims. By way of non-limiting example, for a parabolic dish having a circular periphery, Applicants recognize that a diameter of 600 mm provides for suitable resolution of objects at a wavelength of 3.1 mm. In this regard, Rayleigh' Criterion is useful when considering angular resolution and is given as:

$$\theta = 1.22 \frac{\lambda}{D} \qquad \text{Eqn. (1)}$$

Where D is a diameter of the parabolic reflector, $\theta$ is the angle formed between the two distant objects as viewed from the imaging system and $\lambda$ is the wavelength of interest. For a diameter of 600 mm at a wavelength of 3.1 mm, angle $\theta$ is 0.006 radians which is equal to approximately 0.34 degrees. This is considered by Applicants to provide adequate resolution at distances up to at least 30 meters.

In one embodiment, first polarized secondary reflector 68 can be convex such as, for example, forming a hyperboloid, as shown. In another embodiment, the first polarized secondary reflector can be concave. Like the first primary reflector, the first polarized secondary reflector can include any suitable peripheral outline such as, for example, circular. The polarization directions of first polarized parabolic reflector 64 and first polarized secondary reflector 68 are arranged parallel with one another such as, for example, vertically in the plane of the figure. Hence, the first polarized parabolic reflector and the first polarized secondary reflector have both been illustrated using dashed lines to indicate their polarization. It is noted that, for purposes of the present disclosure, the polarization direction of a component such as, for example, the first polarized parabolic reflector, refers to a polarization that is reflected by that component while an orthogonal polarization is transmitted or passed. The first antenna arrangement can further include a linearly polarized mirror or reflector 70 that behaves as a planar reflector with a polarization direction that is also parallel with the polarization directions of the first parabolic reflector and the first polarized secondary antenna. As is also the case with second camera 34 and noted above with respect to camera 24, the cameras can be polarization sensitive. If that is the case, the polarization direction of each camera should be aligned with the polarization direction of the associated reflectors for that camera. It is noted that the polarization direction of a camera, for purposes of the present application, is a polarization direction that is detected by the camera whereas an orthogonal polarization is not detected.

Still referring to FIG. 1, a second antenna arrangement 60', for second camera 34, receives a portion of image light 50 from the second scene. The components of the second antenna arrangement are the same as those that make up the first antenna arrangement and, therefore, have been designated by the same reference numbers as the components of the first antenna arrangement with an appended prime (') mark. In the instance of second antenna arrangement 60', however, the polarization direction of each of second linearly polarized parabolic reflector 64', second linearly polarized secondary reflector 68' and second linearly polarized mirror 70' is orthogonal with respect to the corresponding components of the first antenna arrangement, which is normal to the plane of the figure in this example. Hence, each of second polarized parabolic reflector 64', second polarized secondary reflector 68' and second polarized mirror 70' has been illustrated using solid lines. In the present embodiment, first polarized parabolic reflector 64 defines a center aperture which receives second polarized secondary reflector 68' while second polarized parabolic reflector 64' defines a center aperture which receives first polarized secondary reflector 68, although this is not required. In other embodiments, the secondary reflectors can be supported, for example, by an arm that extends from an associated one of the parabolic reflectors. Moreover, the secondary reflectors, as well as the primary parabolic reflectors themselves, can be moved laterally in the view of FIG. 1 to any suitable positions, as needed. As shown, first polarized parabolic reflector 64 and second polarized parabolic reflector 64' are in a spaced apart confronting relationship in system 10. While the primary and secondary reflectors in FIG. 1 are axisymmetrical, this is not a requirement. Other embodiments can include an off-axis configuration while still employing the teachings that have been brought to light herein. In this case, reflectors 64 and 64' are not required to be parabolic but instead can be of any suitable shape in view of the off-axis configuration that is used.

As noted above, cameras 24 and 34 each include a single pixel sensor 80 that is responsive to MMW light and a spatial light modulator 84. After passing through spatial light modulator 84 of each camera, a horn 88 collects the light for incidence on an associated one of single pixel sensors 80. During operation of imaging system 10, each spatial light modulator 84 receives control signals on lines 90 from a controller computer 100, which may be referred to as a processor, and can include a monitor 104 having a display screen 106 and an input device 108. In this way, controller computer 100 can set blocking patterns on spatial light modulators 84 in the imaging system. Suitable blocking patterns include by are not limited to Hadamard patterns. In some embodiments of the imaging system, spatial light modulators are not required such that images can be generated based on a real time output of the camera sensors. In such embodiments and as will be further described, the camera sensors can be multi-pixel sensors of any suitable type either currently available or yet to be developed such as, for example, a CMOS CCD sensor for optical light or a multi-pixel arrangement of bolometers for a millimeter wave embodiment. In the instance of multi-pixel sensor control lines 90 from computer 100 are generally not needed. Camera interfaces 110 couple an output signal from each single pixel sensor 80 to controller computer 100 such that the latter can receive a sensed value for each blocking pattern of a series of blocking patterns for purposes of constructing images 112 and 114 for the first and second cameras on display screen 106. While one computer manages both cameras in the present embodiment, this is not a requirement. For example, each camera can provide imaging outputs to and be managed by its own, dedicated control computer.

Advanced spatial light modulators that are suitable for use in the embodiments described herein are described in commonly owned U.S. patent application Ser. No. 15/265,830, entitled Solid State Spatial Light Modulator, filed on Nov. 14, 2016 and commonly owned U.S. patent application Ser. No. 15/977,996, entitled Advanced Blocking Pattern Structures, Apparatus and Methods for a Spatial Light Modulator, filed on May 11, 2018, each of which is hereby incorporated by reference in its entirety.

Having described the structure of system 10 in detail above, it is appropriate at this juncture to take up the details of its operation. Assuming that first image light 40 from scene 20 is initially unpolarized, a portion 130 of light 40 is polarized after passing through second polarized parabolic reflector 64'. In this regard, light 40 to the right of parabolic reflector 64' is represented by a dashed line that is heavier than the dashed line representing polarized transmitted light 130 extending to the left of second polarized parabolic reflector 64' which comprises a portion of light 40. Transmitted light 130 is linearly polarized parallel to the polarization direction of first polarized parabolic reflector 64. Accordingly, upon reaching the first polarized parabolic reflector 64, light 130 is reflected and is, thereafter, incident on first polarized secondary reflector 68 and is, once again, reflected. Light 130 then passes through second polarized secondary reflector 68', due to its polarization, and is then reflected by first polarized mirror 70 to arrive at camera 24. Similarly, second image light 50 from scene 30 is initially unpolarized, a portion 140 of light 50 initially passes through and is linearly polarized by first polarized parabolic reflector 64. In this regard, light 50 to the left of parabolic reflector 64 is represented by a dashed line that is heavier than the dashed line representing transmitted light 140 extending to the right of first polarized parabolic reflector 64. Transmitted light 140 is linearly polarized parallel to the polarization direction of second polarized parabolic reflector 64'. Accordingly, upon reaching second polarized parabolic reflector 64', light 140 is reflected and is, thereafter, incident on second polarized secondary reflector 68' and is, once again, reflected. Light 140 then passes through first polarized secondary reflector 68, due to its polarization, and is then reflected by second polarized mirror 70' to arrive at camera 34.

Applicants submit that imaging system 10, as shown in FIG. 1, provides benefits that are heretofore unavailable in the prior art when wavelength and, potentially, other constraints conspire to require the use of reflectors (i.e., antennas) that are of substantial size. In particular, the imaging system is compact in size based on the use of polarized reflectors in system 10 which allow the reflectors to be placed in close proximity to one another with each camera being able to "see through" the reflectors (i.e., antennas) associated with the other camera to create images of scenes that are in completely opposite viewing directions from one another. In effect, at least some portion of an active volume of space that is dedicated to one camera for imaging purposes in a multi-camera system efficiently overlaps the active volume of space that is dedicated to a different camera for imaging purposes. In FIG. 1, this overlap at least includes the region between the first and second polarized parabolic reflectors. At the same time, compactness is still further enhanced by placing the cameras side-by-side rather than being placed back-to-back, as one might expect in a prior art system having opposed viewing directions.

Figure 2:
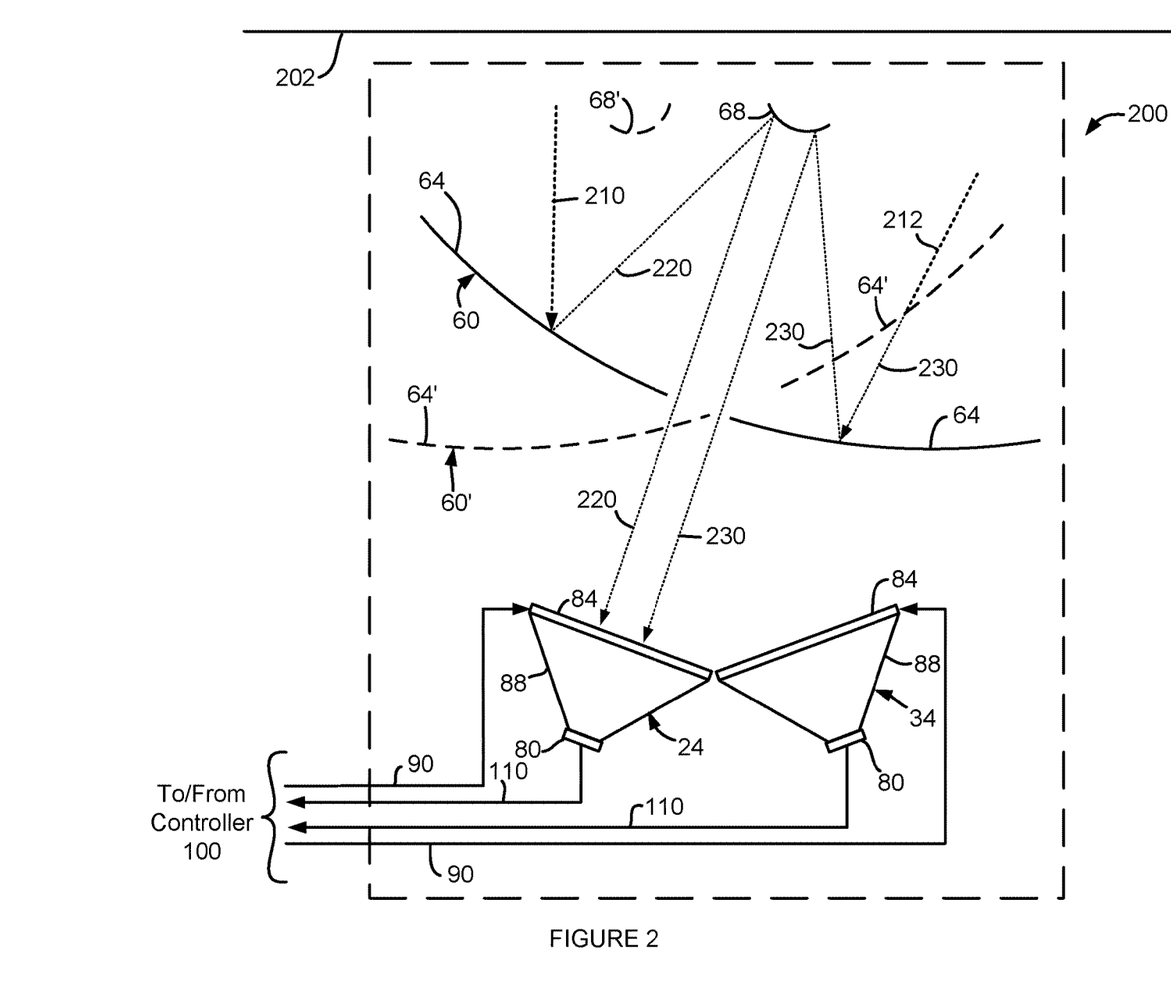
FIG. 2 is a diagrammatic plan view illustrating another embodiment of an imaging system produced in accordance with the present disclosure.

FIG. 2 is a diagrammatic plan view illustrating another embodiment of an imaging system, generally indicated by the reference number 200, produced in accordance with the present disclosure. Descriptions of like components may not be repeated for purposes of brevity and the reader is referred to the descriptions of FIG. 1 for such discussions. System 200 is configured for imaging a field of view 202 (diagrammatically shown as a line), using cameras 24 and 34, that is wider than the field of view that would otherwise be provided by one of the cameras. At the same time, the respective fields of view of the cameras at least partially overlap, as will be described.

First antenna arrangement 60 includes first polarized parabolic reflector 64 and first polarized secondary reflector 68 that are axially aligned with respect to camera 24, although this is not a requirement. In some embodiments, an off-axis implementation can be used. It is noted that polarized mirror 70 of FIG. 1 is not needed in the embodiment of FIG. 2. Second antenna arrangement 60' includes second polarized parabolic reflector 64' and second polarized secondary reflector 68' that are axially aligned with respect to camera 34, with polarized mirror 70' of FIG. 1 not needed. Each of parabolic reflectors 64 and 64' defines a center aperture. Unlike FIG. 1, each of the first and second secondary reflectors is spaced apart from its respective parabolic reflector in the imaging direction and is supported in any suitable manner such as, for example, by an arm extending from a respective one of the parabolic reflectors. As another distinction with respect to system 10 of FIG. 1, first polarized parabolic reflector 64 and second polarized parabolic reflector 64' physically overlap one another. This can be implemented, for example, by fabricating the reflectors using a parallel wire (i.e., electrically conductive) grating. Since the wire grating of the first parabolic reflector must be orthogonal with respect to the wire grating of the second parabolic reflector in order to achieve orthogonal polarization directions, the wires of the wire grating of the first parabolic reflector can be interlaced with the wires of the wire grating of the second parabolic reflector such that the reflectors can essentially pass through one another.

Having described the structure of system 200 in detail above, a description of its operation will be provided based on first and second example ray traces 210 and 212 in FIG. 2, which represent image light from the scene that is being imaged. Incident ray 210 is initially incident on first polarized parabolic reflector 64 such that one portion 220 of the incident light ray is reflected in a linear polarization. It is noted that incident ray 210 is shown by a dotted line that is heavier than the dotted line representing reflected portion 220. The latter is then reflected by first polarized reflector 68 and then travels to camera 24. Incident ray 212 is initially incident on second polarized parabolic reflector 64' such that one portion 230 of incident light ray 212 is transmitted in a linear polarization. Again, incident ray 212 is shown by a dotted line that is heavier than the dotted line representing transmitted portion 230. The latter is then reflected by first polarized parabolic reflector 64 and travels to first polarized secondary reflector 68. Light ray 230 is reflected by the first polarized secondary reflector to camera 24. It is noted that light ray 230 serves as an example of camera 24 seeing through reflector 64' of camera 34.

Figure 3:
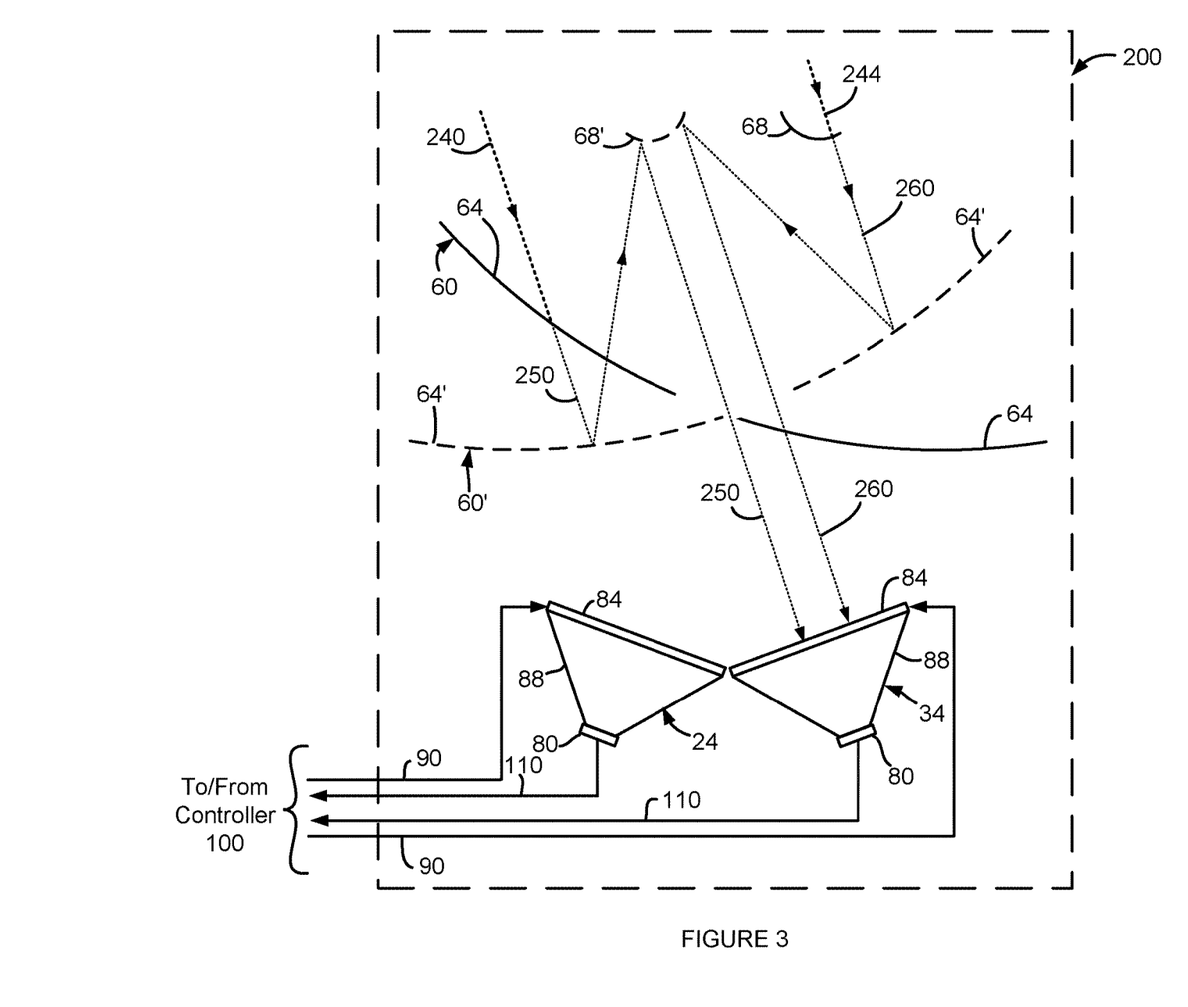
FIG. 3 is another diagrammatic plan view of the embodiment shown in FIG. 2, shown here to illustrate additional details of its operation.

FIG. 3 again illustrates imaging system 200, but with light rays 240 and 244 of initially unpolarized light from the scene being imaged. Light ray 240 is initially incident upon first polarized parabolic reflector 64 such that a transmitted portion 250 of linearly polarized light passes therethrough. Light ray 240 is shown using a heavier dotted line than the dotted line representing transmitted light 250. The latter is then incident upon second polarized parabolic reflector 64' and is reflected to again pass through first polarized parabolic reflector 64 enroute to second polarized secondary reflector 68' which again reflects light ray 250 such that it passes through the aperture of second polarized parabolic reflector 64' as the light ray travels to camera 34. It is noted that light ray 250 serves as an example of camera 34 seeing through reflector 64 of camera 24. Light ray 244 is initially incident upon first polarized secondary reflector 68 such that a transmitted portion 260 of linearly polarized light passes therethrough. Light ray 244 is shown using a heavier dotted line than the dotted line representing transmitted light 260. The latter is then incident upon second polarized parabolic reflector 64' and is reflected to second polarized secondary reflector 68' which again reflects light ray 260 such that it passes through the aperture of second polarized parabolic reflector 64' as the light ray travels to camera 34.

Like imaging system 10 of FIG. 1, imaging system 200 provides the remarkable benefit of allowing each camera to see through the antennas or reflectors of the other camera such that the cameras can be positioned adjacent to one another in a side-by-side relationship to provide for a more compact imaging system. This compactness is further enhanced by the overlap in the physical space that is occupied by the antenna arrangements.

Figure 4:
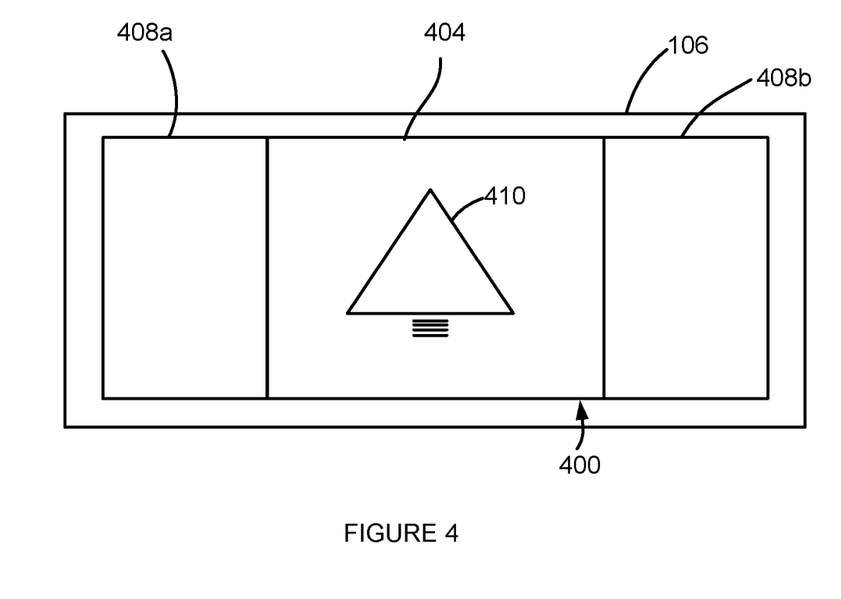
FIG. 4 is a diagrammatic illustration of one embodiment of the image output of the imaging system shown in FIGS. 2 and 3.

FIG. 4 is a diagrammatic illustration of an image output 400 on display screen 106 produced by controller 100 including an overlapping region 404 and a pair of side regions 408a and 408b including a tree 410 at the center of image output 400. The side regions can be referred to collectively as side regions 408. As is the case with the outputs of the cameras in system 10 of FIG. 1, there is no requirement for the use of a single control computer in system 200 and each camera can be controlled and its output used independently. It is noted that the first scene, viewed by camera 24, corresponds to regions 408b and 404 while the second scene, viewed by camera 34, corresponds to regions 408a and 404. Given that both polarizations of light are gathered for overlap region 404, the signal to noise ratio for that region can be higher than the signal to noise ratio for side regions 408, resulting in a relatively higher quality image in the overlap or center region while still maintaining a wide field of view.

Figure 5:
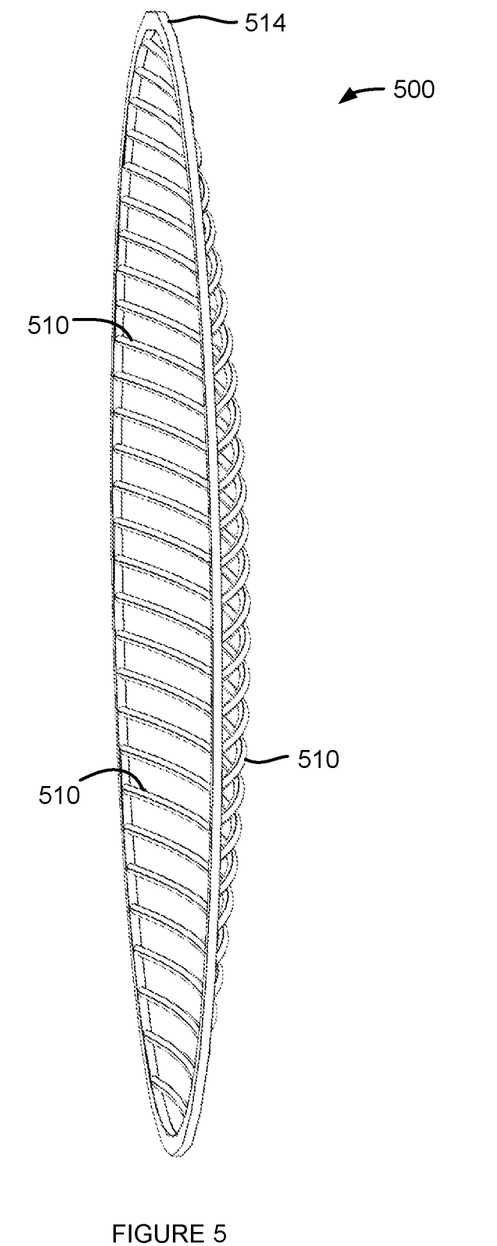
FIG. 5 is a diagrammatic view, in perspective, of an embodiment of a parabolic or dish antenna that exhibits polarization.
Figure 6:
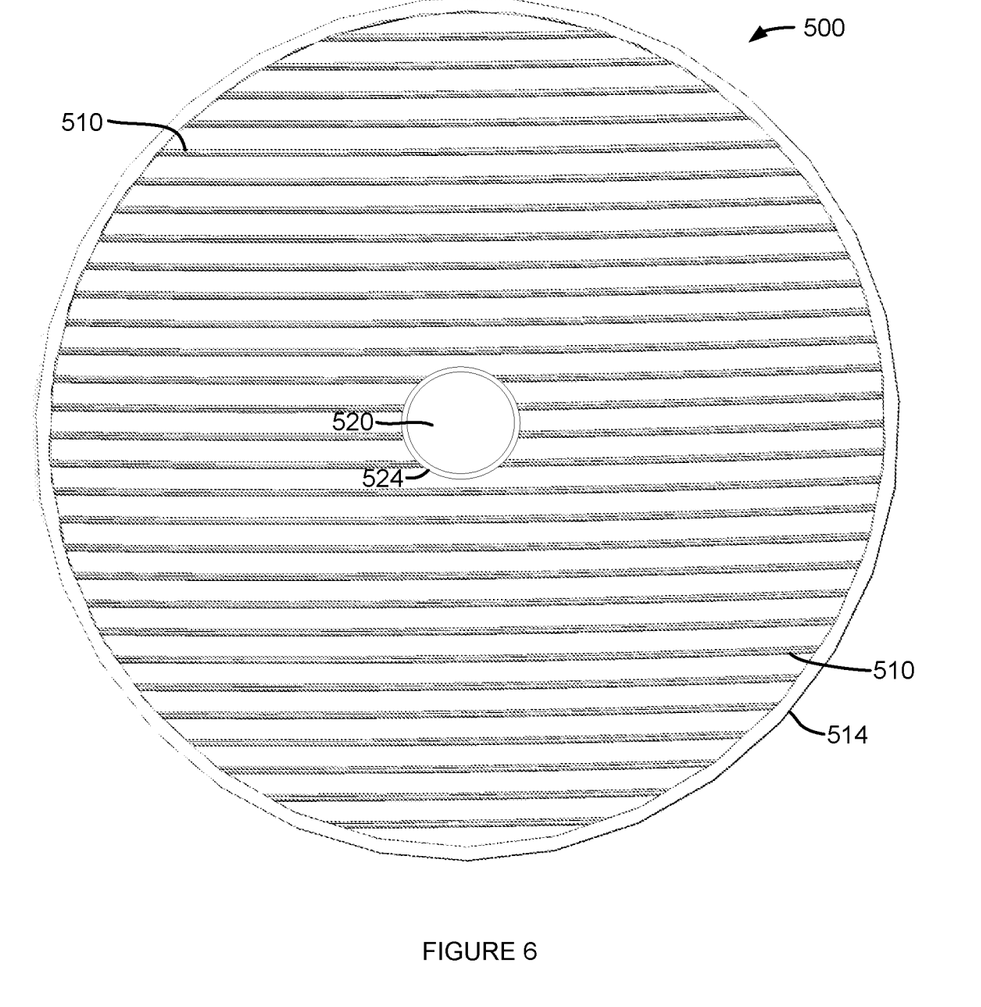
FIG. 6 is a diagrammatic view, in elevation, of the parabolic antenna of FIG. 6 illustrating further details of its structure as well as its intersection with a second, overlapping parabolic antenna.

FIG. 5 is a diagrammatic view, in perspective of a parabolic or dish antenna, generally indicated by the reference number 500, that exhibits polarization, for example at millimeter wavelengths. Dish antenna 500 is formed using parallel wires or electrical conductors 510 (a number of which are individually designated) in a grating supported by a wire frame 514. In this regard, the wire-to-wire spacing can be approximately 0.3 mm for light at 94 GHz. In an embodiment, the wire frame is circular, although this is not a requirement. It is noted that each wire of the grating is curved in a parabolic shape. FIG. 6 is a diagrammatic view, in elevation, of an embodiment of dish antenna 500 including an aperture 520. In the present example, aperture 520 is a center aperture, although this is not a requirement. The aperture can be formed by cutting away wires 510 within the desired location of the aperture and attaching the cut wires to an aperture frame 524 having a suitable peripheral outline. It is noted that antenna 500 can serve as a first antenna that physically overlaps or intersects a second polarized parabolic reflector having the opposite polarization by interlacing the parallel wire gratings of the two antennas, as will be further described at an appropriate point hereinafter.

Figure 7:
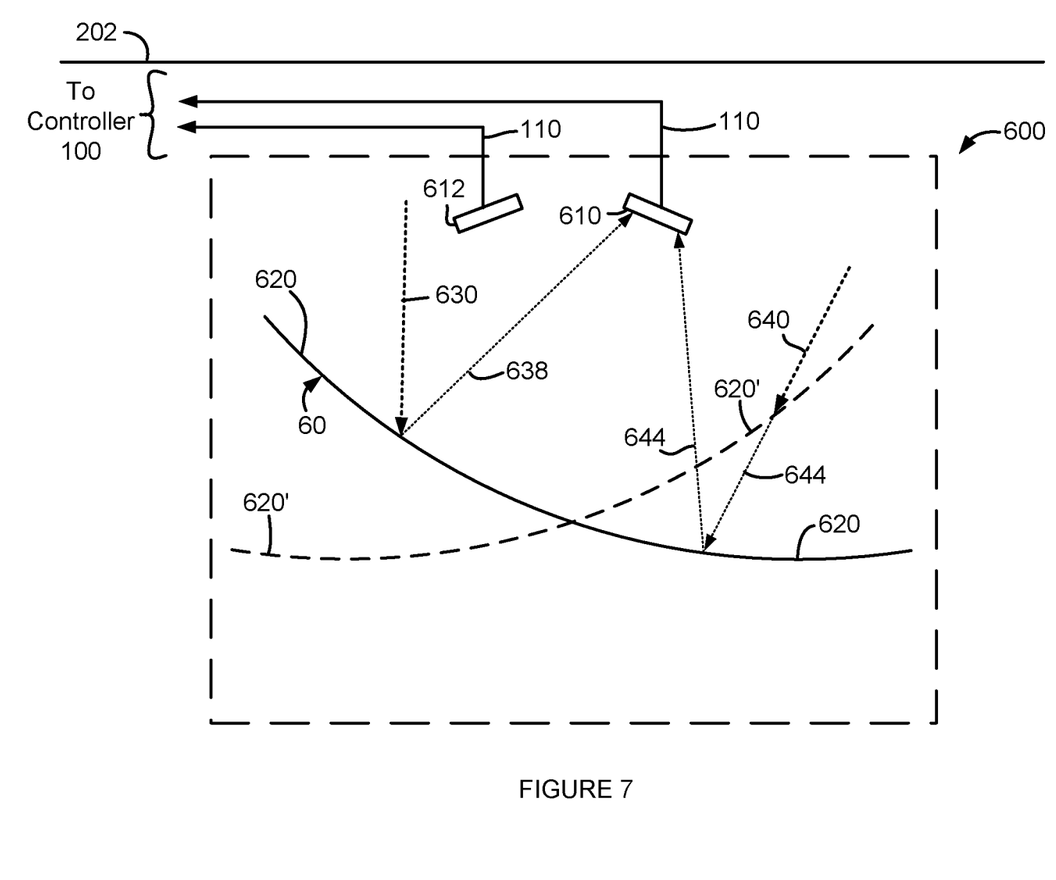
FIG. 7 is a diagrammatic plan view of still another embodiment of an imaging system produced in accordance with the present disclosure.

FIG. 7 is a diagrammatic plan view illustrating another embodiment of an imaging system, generally indicated by the reference number 600, produced in accordance with the present disclosure. Descriptions of like components may not be repeated for purposes of brevity and the reader is referred to the descriptions of FIG. 1 for such discussions. System 600 is configured for imaging field of view 202, in a manner that resembles system 200 of FIGS. 2 and 3 with the exception that cameras 24 and 34 have been replaced by cameras 610 and 612, respectively, such that secondary polarized reflectors are not needed, as will be evident based on these descriptions. Each of cameras 610 and 612 can comprise a multi-pixel camera sensor of any suitable type either currently available or yet to be developed such as, for example, a CMOS CCD sensor for optical light or a multi-pixel arrangement of bolometers for a millimeter wave embodiment. Accordingly, cameras 610 and 612 may be referred to interchangeably as sensors. If the sensors are polarized, alignment with the polarization direction of an associated one of the parabolic reflectors, yet to be described, is necessary. As is the case with system 200 of FIGS. 2 and 3, field of view 202 for imaging system 600 is wider than the field of view that would otherwise be provided by one of the cameras while, at the same time, the respective fields of view of the cameras at least partially overlap. It is noted that the overall image generated by system 600 is essentially the same as image output 400 of FIG. 4 with a central overlapping region and side regions. While each sensor can block some amount of light that would otherwise be incident on the other sensor, it is considered that the blocked light is insignificant in the context of the overall image as is also the case, for example, with arms or other support structures that are used to support the sensors or secondary reflectors in other embodiments.

A first antenna 620 can comprise a first linearly polarized parabolic reflector, associated with sensor 610, that can correspond to aforedescribed first linearly polarized parabolic reflector 64 without a center aperture. A second antenna 620' can comprise a second linearly polarized parabolic reflector, associated with sensor 612, that can correspond to aforedescribed second linearly polarized parabolic reflector 64' without a center aperture and which physically overlaps first antenna 620. As described above, the first and second antennas can be implemented using a parallel wire structure. First sensor 610 is axially aligned with reflector 620 while second sensor 612 is axially aligned with reflector 620'. It is noted that each sensor can be supported by one or more arms (not shown for purposes of maintaining illustrative clarity) that extends from an associated one of the reflectors. In some cases, one or more arms can extend from the periphery of each reflector to a support platform or foundation for each sensor. In other embodiments, an off-axis configuration can be used wherein reflectors 620 and 620' are not required to be parabolic but instead can include any suitable shape that is consistent with the particular off-axis configuration that is in use.

Referring to FIG. 7, ray traces 630 and 640 illustrate the operation of system 600 with respect to sensor 610. Incident ray 630 is initially incident on first polarized parabolic reflector 620 such that one portion 638 of the incident light ray is reflected in a linear polarization. It is noted that incident ray 630 is shown by a dotted line that is heavier than the dotted line representing reflected portion 638. The latter is then incident on sensor 610 for generating an output on interface lines 110 connected to controller computer 100. Incident ray 640 is initially incident on second polarized parabolic reflector 620' such that one portion 644 of incident ray 640 is transmitted in a linear polarization. Again, incident ray 640 is shown by a dotted line that is heavier than the dotted line representing transmitted portion 644. The latter is then reflected by first polarized parabolic reflector 620, travels back through reflector 620' and is then incident on sensor 610 for generating an output on interface lines 110 connected to computer 100. It is noted that light ray 640 serves as an example of sensor 610 seeing through reflector 620' associated with sensor 612.

Figure 8:
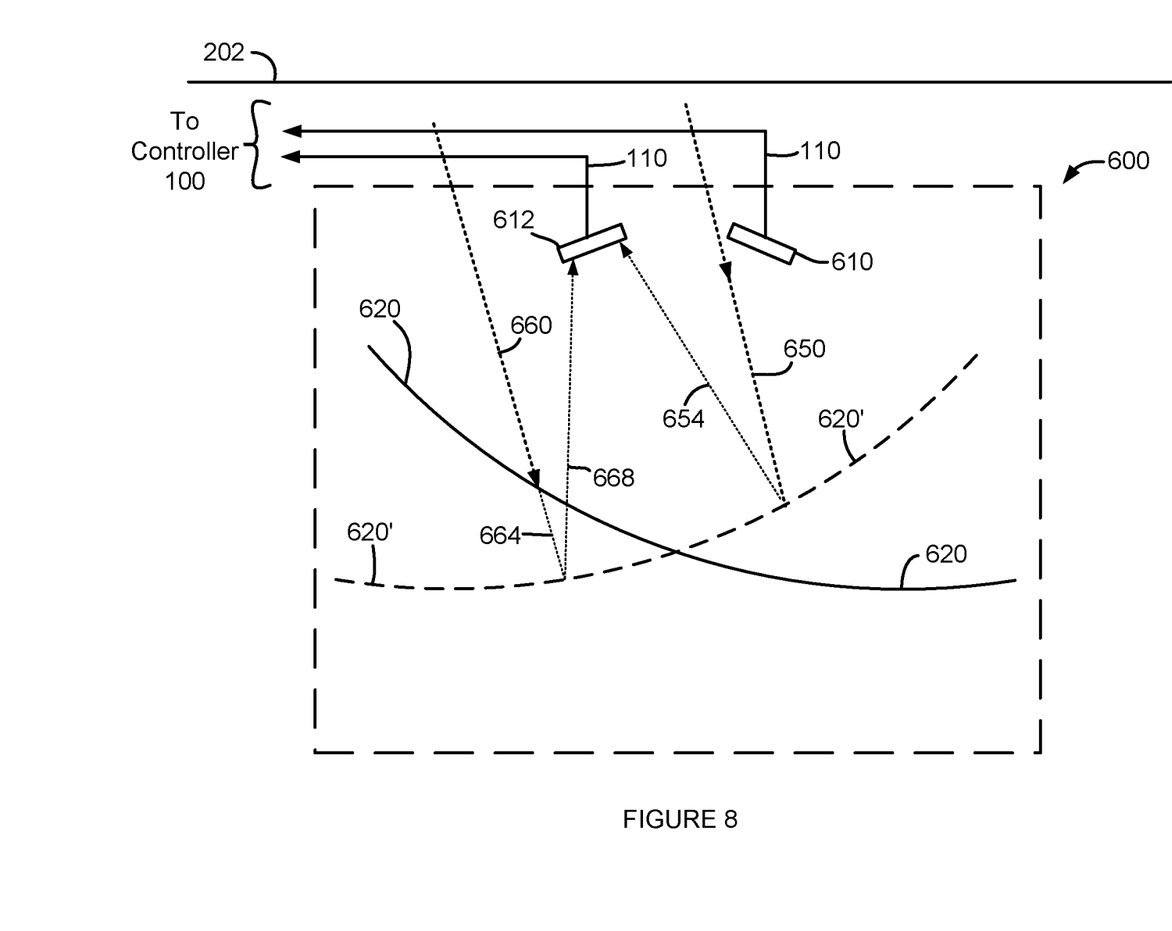
FIG. 8 is another diagrammatic view of the embodiment of the imaging system of FIG. 7, shown here to illustrate additional details of its operation.

Referring to FIG. 8, ray traces 650 and 660 illustrate the operation of system 600 with respect to sensor 612. Incident ray 650 is initially incident on second polarized parabolic reflector 620' such that one portion 654 of the incident light ray is reflected in a linear polarization. It is noted that incident ray 650 is shown by a dotted line that is heavier than the dotted line representing reflected portion 654. The latter is then incident on sensor 612 for generating an output on interface lines 110 connected to controller computer 100. Incident ray 660 is initially incident on first polarized parabolic reflector 620 such that one portion 664 of incident ray 660 is transmitted in a linear polarization. Again, incident ray 660 is shown by a dotted line that is heavier than the dotted line representing transmitted portion 664. The latter is then reflected by second polarized parabolic reflector 620', and portion 668 travels back through reflector 620 and is then incident on sensor 612 for generating an output on interface lines 110 connected to computer 100. It is noted that light ray 660 serves as an example of sensor 612 seeing through reflector 620 associated with sensor 610.

Figure 9A:
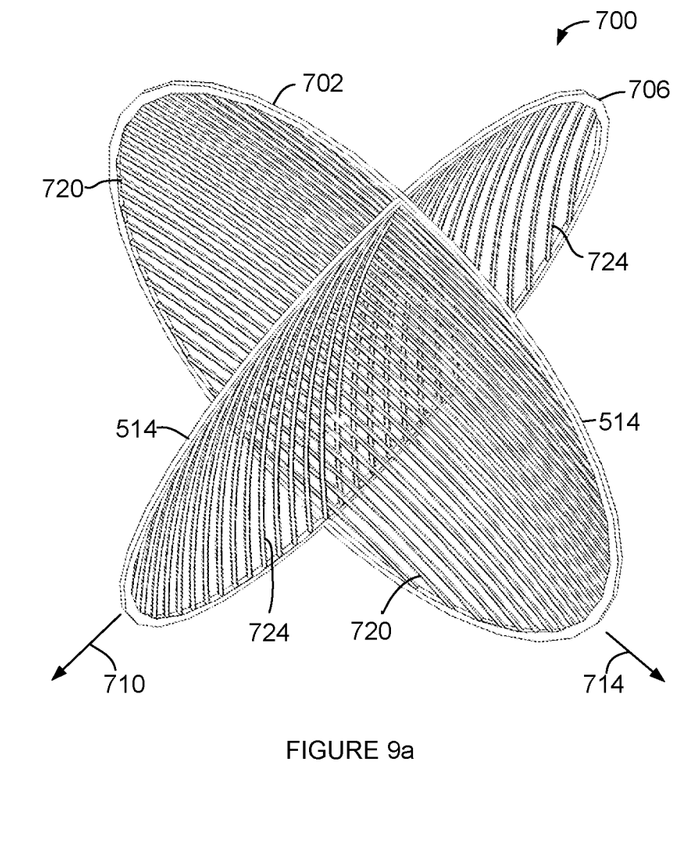
FIG. 9a is a diagrammatic view, in perspective, of an embodiment of an antenna arrangement, shown here for purposes of illustrating details of overlapping polarized parabolic dish antennas/reflectors.
Figure 9B:
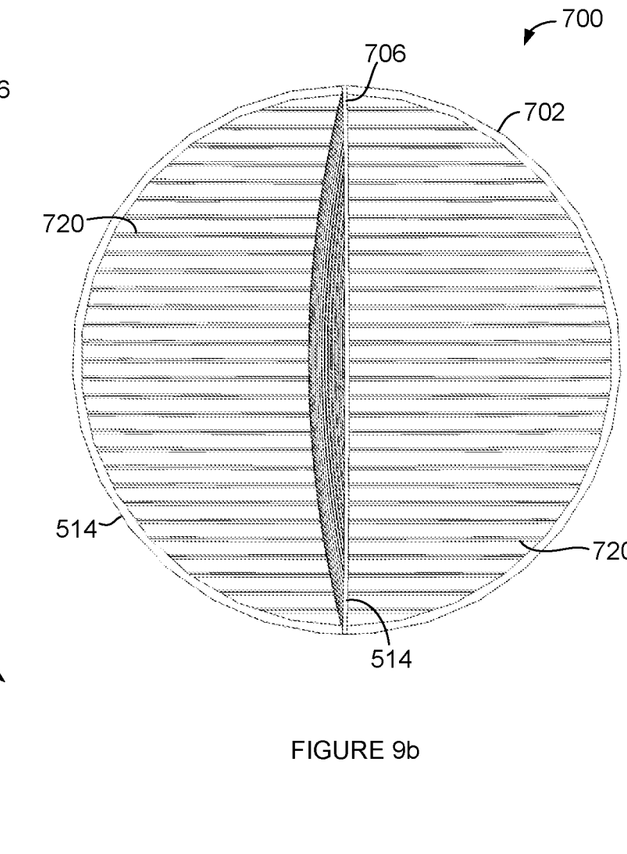
FIG. 9b is a diagrammatic view, in elevation, of the antenna arrangement of FIG. 9a taken in the direction that is normal to the periphery of a first one of the illustrated parabolic dish antennas.

FIG. 9a is a diagrammatic view, in perspective, of an embodiment of an antenna arrangement, generally indicated by the reference number 700 and shown here for purposes of illustrating details of overlapping polarized parabolic dish antennas/reflectors. FIG. 9b is a diagrammatic view, in elevation, of antenna arrangement 700. In particular, antenna arrangement 700 includes a first polarized parabolic reflector 702 and a second polarized parabolic reflector 706. The first polarized parabolic dish includes an axis of symmetry 710, indicated by an arrow, on the side of the first dish including its focal point while the second polarized parabolic dish includes an axis of symmetry 714, also indicated by an arrow, on the side of the second dish including its focal point. In the present embodiment, the first axis of symmetry is orthogonal to the second axis of symmetry, although this specific angular relationship is not a requirement. It is noted that antenna arrangement 700 is readily adaptable for use in system 600 of FIGS. 7 and 8 based on adjusting the angular orientation of the first and second polarized parabolic dishes/reflectors (i.e., axes of symmetry) with respect to one another. The outer periphery of each of the first and second parabolic dishes is shown as circular in the present embodiment, although any suitable outer peripheral shape can be used. Each of the first and second parabolic reflectors is formed using electrical conductors (i.e., wires) that are parallel to form what is referred to as a grating in the manner described above with respect to parabolic reflector 500 of FIG. 5 supported by frame 514. A number of the parallel electrical conductors of first reflector 702 are indicated by the reference number 720 while a number of the parallel electrical conductors of second reflector 706 are indicated by the reference number 724. The first parabolic reflector and second parabolic reflector physically overlap, with the wires of one of the reflectors passing through spaces between the wires of the other reflector. In some embodiments, it should be appreciated that some of the electrical conductors of the first parabolic reflector can be physically attached to some of the electrical conductors of the second parabolic reflector, for example, by welding, soldering, or any other suitable technique. Applicants submit that this antenna arrangement provides heretofore unseen benefits at least with respect to compactness. It is noted that each of the first parabolic reflector and the second parabolic reflector can be formed with a center aperture, if needed.

The foregoing description of the invention has been presented for purposes of illustration and description. Accordingly, the present application is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. An imaging system, comprising:
   a first camera and a second camera; and
   a first antenna arrangement for collecting image light from a first scene as seen by the first camera, and a second antenna arrangement for collecting image light from a second, different scene as seen by the second camera, the first antenna arrangement including a first linearly polarized dish antenna and the second antenna arrangement including a second linearly polarized dish antenna, and the first camera and the second camera are supported with a first polarization of the first linearly polarized dish antenna orthogonal to a second polarization of the second linearly polarized dish antenna such that at least some of the image light from the first scene travels through the second linearly polarized dish antenna to reach the first camera and at least some of the image light from the second scene travels through the first linearly polarized dish antenna to reach the second camera.

2. The imaging system of claim 1 wherein the first camera produces a first digital image responsive to the first scene and the second camera produces a second digital image responsive to the second scene.

3. The imaging system of claim 2, further comprising:
a processor configured for combining the first digital image and the second digital image into an overall digital image.

4. The imaging system of claim 1 wherein a first imaging axis of the first camera is parallel to a second imaging axis of the second camera such that the first camera and the second camera face at least generally in a common direction.

5. The imaging system of claim 4 wherein the first camera and the second camera are in a side-by-side relationship.

6. The imaging system of claim 4 wherein the first camera and the second camera are in a side-by-side spaced apart relationship.

7. The imaging system of claim 1 wherein the first linearly polarized dish antenna and the second linearly polarized dish antenna are paraboloids.

8. The imaging system of claim 1 wherein the first scene viewed by the first camera is in an opposite direction from the imaging system with respect to the second scene viewed by the second camera.

9. The imaging system of claim 8 wherein the first linearly polarized dish antenna of the first antenna arrangement is in a spaced apart confronting relationship with the second linearly polarized dish antenna of the second antenna arrangement.

10. The imaging system of claim 9 wherein the first antenna arrangement includes a first polarized secondary reflector and the second antenna arrangement includes a second polarized secondary reflector such that the first linearly polarized dish antenna defines a first center aperture that supports the second polarized secondary reflector at the second polarization to reflect image light of the second scene from the second linearly polarized dish antenna for the second camera and the second linearly polarized dish antenna defines a second center aperture that supports the first polarized secondary reflector at the first polarization to reflect image light of the first scene from the first linearly polarized dish antenna for the first camera.

11. The imaging system of claim 10 wherein the first and second polarized secondary reflectors are hyperboloids.

12. The imaging system of claim 10 wherein the first antenna arrangement includes a first polarized mirror and the second antenna arrangement includes a second polarized mirror with the first polarized mirror supported to reflect image light of the first scene received from the first polarized secondary reflector at the first polarization to the first camera and with the second polarized mirror supported to reflect image light of the second scene received from the second polarized secondary reflector at the second polarization to the second camera.

13. The imaging system of claim 1 wherein a first imaging axis of the first camera is transverse to a second imaging axis of the second camera such that the first camera and the second camera face in a first direction and a second direction, respectively, and the first scene and the second scene partially overlap.

14. The imaging system of claim 13 wherein the first camera and the second camera are in a side-by-side relationship.

15. The imaging system of claim 14 wherein the first linearly polarized dish antenna of the first antenna arrangement and the second linearly polarized dish antenna of the second antenna arrangement face in the first direction and the second direction, respectively.

16. The imaging system of claim 15 wherein the first antenna arrangement includes a first polarized secondary reflector and the first linearly polarized dish antenna defines a first center aperture, and the second antenna arrangement includes a second polarized secondary reflector and the second linearly polarized dish antenna defines a second center aperture with the first polarized secondary reflector spaced away from the first center aperture in the first direction toward the first scene and with the second polarized secondary reflector spaced away from the second center aperture in the second direction toward the second scene.

17. The imaging system of claim 16 wherein the first linearly polarized dish antenna includes a first axis of symmetry and the second linearly polarized dish antenna includes a second axis of symmetry with the first polarized secondary reflector arranged such that the first axis of symmetry passes therethrough and with the second polarized secondary reflector arranged such that the second axis of symmetry passes therethrough.

18. The imaging system of claim 1 wherein each of the first camera and the second camera includes a single pixel imaging sensor and a spatial light modulator positioned between each single pixel imaging sensor and a respective one of the first and second antenna arrangements.

19. A method for producing an imaging system, said method comprising:
providing a first camera and a second camera;
configuring a first antenna arrangement for collecting image light from a first scene as seen by the first camera, and configuring a second antenna arrangement for collecting image light from a second, different scene as seen by the second camera, the first antenna arrangement configured with a first polarized dish antenna and the second antenna arrangement configured with a second polarized dish antenna; and
supporting the first camera and the second camera with a first polarization of the first polarized dish antenna orthogonal to a second polarization of the second polarized dish antenna such that at least some of the image light from the first scene travels through the second polarized dish antenna to reach the first camera and at least some of the image light from the second scene travels through the first polarized dish antenna to reach the second camera.

* * * * *